United States Patent

[11] 3,548,153

[72] Inventor Edward L. Kells
 Batavia, Ill.
[21] Appl. No. 835,641
[22] Filed June 23, 1969
[45] Patented Dec. 15, 1970
[73] Assignee Dover Corporation
 New York, N.Y.
 a corporation of Delaware

[54] COOKING AND THAWING OVEN
 9 Claims, 4 Drawing Figs.
[52] U.S. Cl. .................................................. 219/400;
 126/21; 219/376, 219/397, 219/413
[51] Int. Cl. ....................................................... A21b 1/22;
 F27d 11/02
[50] Field of Search ............................................ 219/400-
 —413, 460, 375, 396—399; 126/21A, 274;
 99/251, 1

[56] References Cited
 UNITED STATES PATENTS
 975,107 11/1910 Ayer et al. ...................... 219/400
 2,179,256 11/1939 Gill ................................ 219/400X

| | | |
|---|---|---|
| 2,248,867 | 7/1941 | Hallman, Sr. ................. 219/400 |
| 2,906,620 | 9/1959 | Jung ............................ 99/1 |
| 3,221,729 | 12/1965 | Beasley et al. ................. 126/21 |
| 3,279,451 | 10/1966 | Oehring ....................... 126/21 |
| 3,368,062 | 2/1968 | Gramenius et al. ............ 219/400 |

Primary Examiner—Volodymyr Y. Mayewsky
Attorney—Darbo, Robertson and Vandenburgh ABSTRACT: A combined frozen food thawing and food cooking oven has a plurality of racks defining a plurality of food holding spaces stacked one above the other. A heating unit is positioned above and below each of the spaces. The heating units are linear and have a maximum heating capacity no greater than about 93 b.t.u.'s per square inch of radiator surface area, and no greater than about 33 b.t.u.'s per square inch of the horizontal part of said space. The uppermost and lowermost of the heating units of the stack have about half the heating capacity of the intermediate heating units. The heating units are removable and can be reinserted in a zone spaced from the cooking chamber. A fan and duct work provide air circulation through and between the zone and chamber to permit hot air cooking.

PATENTED DEC 15 1970

Inventor:
Edward L. Kells
By:
Darbo, Robertson & Vandenburgh
Attys.

Inventor:
Edward L. Kells
By Darbo, Robertson & Vandenburgh
Attys.

3,548,153

COOKING AND THAWING OVEN

BACKGROUND OF THE INVENTION

Many large volume eating establishments, such as hotels, airlines, and the like, have found it to be a desirable procedure to prepare the various food dishes in large quantities well in advance, freeze the food in units of substantial size, and then thaw and heat the food immediately prior to its being served for consumption. This procedure has substantial savings in the cost, etc., of food preparation. When the desired quantity and serving time are known, the food can be prethawed in a refrigerator and then merely heated up immediately prior to serving. However, in many such establishments it is impossible to predict the exact quantity that will be needed. For example, an airline or a hotel may have a last minute influx of patrons for whom food must be made available. It is not economical to prethaw an excess because this may result in substantial wastage. The preferable procedure is for the hotel or airline, etc. to have a way of thawing and heating the containers of frozen food in a relatively short time. The heating after thawing should be up to about 160°—165° F. to prevent bacterial growth.

Various forms of thawing and heating equipment have been proposed and used, at least to a limited extent, commercially. These include such practices as immersing watertight containers of the food in hot water, infrared heating of the food, heating by high frequency radiation, etc. All of these methods have various disadvantages. The use of waterproof containers in the form of plastic bags or the like result in the bags of hot cooked food being difficult to handle, particularly in the relatively large quantities used commercially. The commercially employed infrared thawing units tend to hot spot and to overcook portions of the exterior of the block of food before the interior is even thawed. This is particularly complicated by the fact that many foods are much more subject to thermal degradation than are others. For example, most foods containing cheese are very sensitive to heat. Other items, such as beef stew, will withstand a great deal of heat "abuse" without being deleteriously affected. High frequency heating is quite unsatisfactory where the material to be heated contains ice crystals which makes it a poor method for the thawing of food.

The present invention falls into the general category of the infrared thawing units, however, it has a number of distinctions from the conventional devices which makes it much more satisfactory for its intended use. So far as I am aware, all of the radiators in the infrared thawing units, proposed or used commercially, operate in the visible (under normal lighting conditions) area of the spectrum, i.e., the units get "red hot". Using electrical resistance heaters these will be operated with a heat output with something like 40 watts (about 136.6 B.t.u.'s) per square inch of surface of the radiator. In contrast to this, my invention required that the maximum heat output of such a resistance heater be no greater than about 27 watts (93B.t.u.') per square inch of surface of the radiator. Operating in this range no visible radiation is apparent under normal lighting conditions. For all practical purposes, this will thaw food as rapidly as the commercially available units. The completely frozen block of food can withstand large quantities of heat, but as the exterior of the block commences to thaw there is poor heat transfer from the exterior through the thawed outer layer to the frozen interior of the block.

A further area in which the present invention improves upon the prior art practices is in the manner in which control of the temperature is maintained. Probably the most commonly employed temperature controls used commercially for this type of apparatus are adaptations of conventional oven procedures. That is, a temperature sensor is appropriately positioned within the enclosure to turn the heating means on and off at predetermined temperature values. While this procedure is eminently satisfactory for an oven wherein the heating means and the oven contents do not vary widely in temperature, one from the other, I believe that it is one of the sources of difficulty arising in connection with efforts to thaw frozen blocks of food. Here there is a very large disparity between the temperature of the block of food and the heating means which, in my opinion, results in the heating means not suitably or properly applying heat to the block. For this purpose, I recommend the use of a control that supplies the heat in a more uniform pattern with the result that the thawing occurs rapidly, even though lower maximum instantaneous heat application is employed, and results in substantially less deleterious effect on the food. This is a proportional control wherein the heat is turned on and off on a time basis, rather than a temperature basis, with the percentage of on-time versus off-time being preset to control the heat application rate. Provision is made for higher heat application rates initially when the block is completely frozen and lower heat application rates after the exterior of the block has commenced to thaw.

In conjunction with the proportional control, the thermal mass and flywheel effect of the heating element itself is an important factor. The conventional, relatively high watt density heating elements are small and have little mass. When they are cycled on and off they tend to be either very hot or quite cold so that a food receives either too much heat for a brief period of time or too little heat. The sheathed (e.g., Calrod), relatively low watt density heating elements employed in the present invention are comparatively heavy and slow to respond so that the pulsing of the electricity to the heating element causes it to float in a relatively slow wave with the radiating exterior surface being only little above or only little below a desired average temperature. As a result, the food receives radiation at almost a constant rate which can be as near as practical to the maximum that the food can accept without deleterious action occurring. The low watt density heating units previously described and used in this invention (as distinguished from the prior art) should have a thermal mass of the order of that found in the conventional metal sheathed and packed heating units. They are packed with an electrical insulator, e.g. magnesium oxide, to ensure against electrical contact with the metal sheath. This electrical insulator must have adequate thermal conductivity to move the heat from the electrical resistance wire to the sheath. The optimum cross section is circular. The same thermal mass can be achieved by other forms of radiators in which the heating element is embedded in an electrical insulator to add thermal mass.

SUMMARY OF THE INVENTION

The present invention relates to a combined food cooking oven and frozen food thawing oven wherein the heat application is comparatively even to achieve the most effective operation under either situation.

DESCRIPTION OF THE DRAWINGS

FIG. 4 is a schematic diagram of the control apparatus.

DESCRIPTION OF THE SPECIFIC EMBODIMENT

Figure 1:
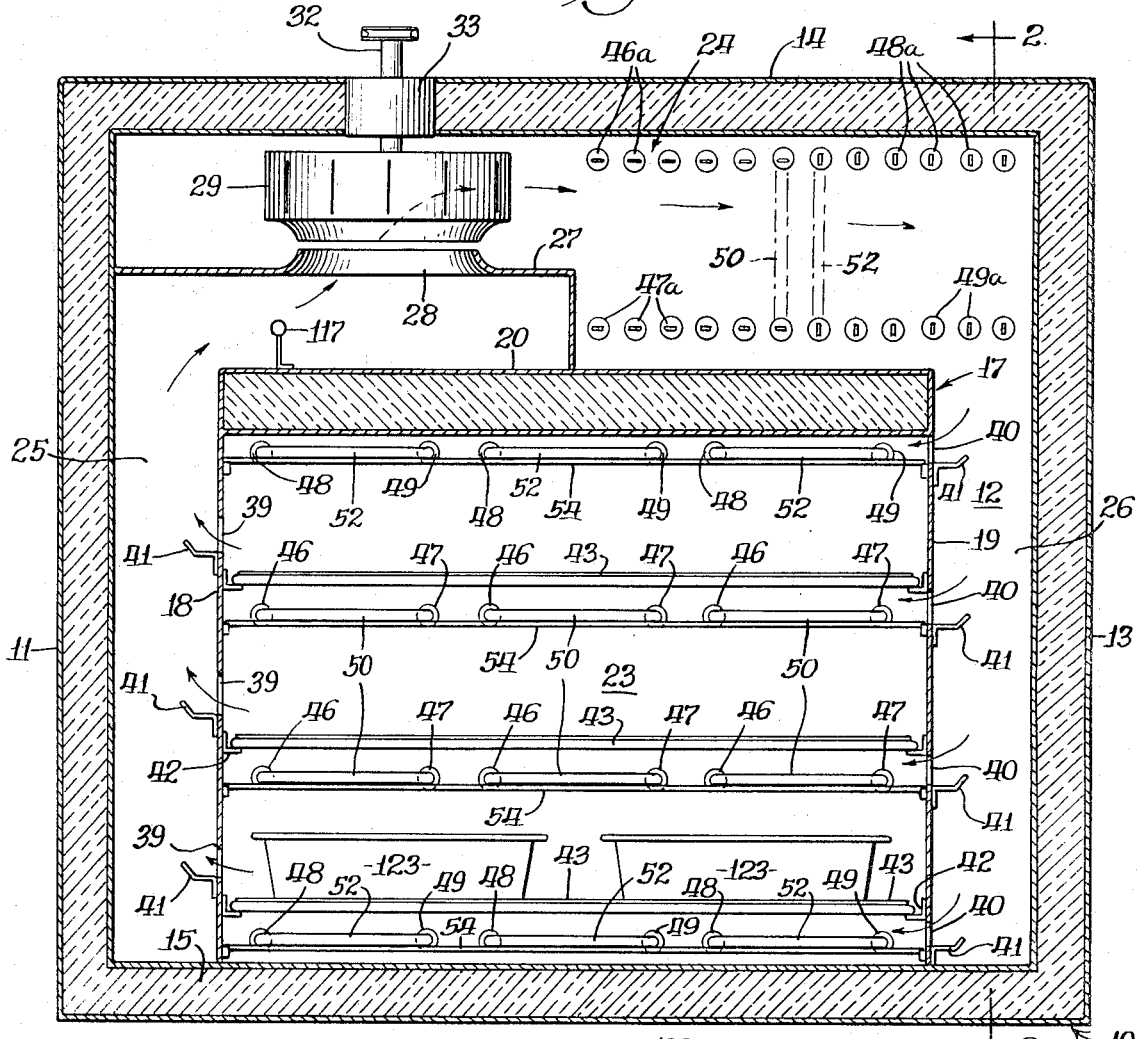
FIG. 1 is a vertical section (as seen at line 1–1 of FIG. 2) of an embodiment of the invention with portions in elevation.
Figure 2:
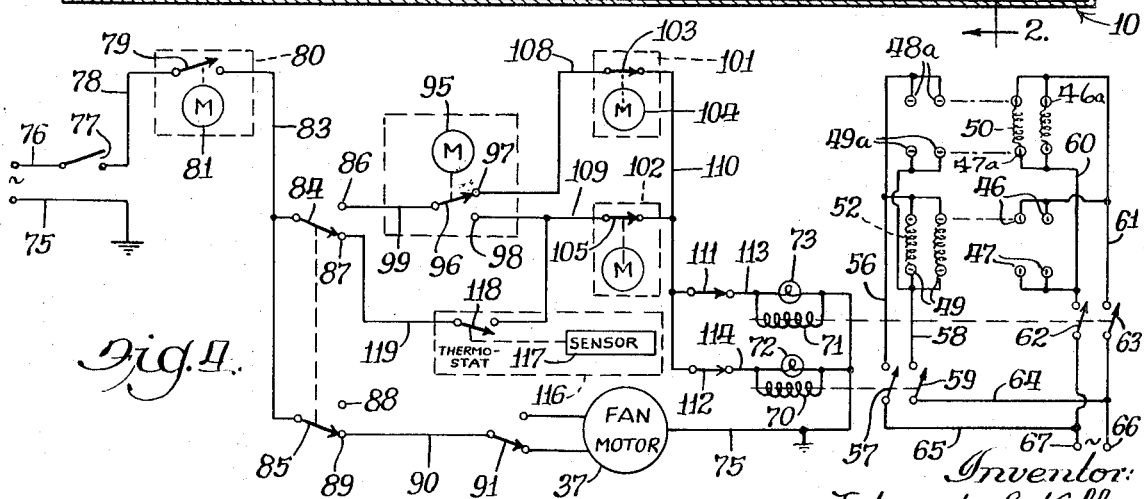
FIG. 2 is a vertical section as seen at line 2–2 of FIG. 1.
Figure 2:
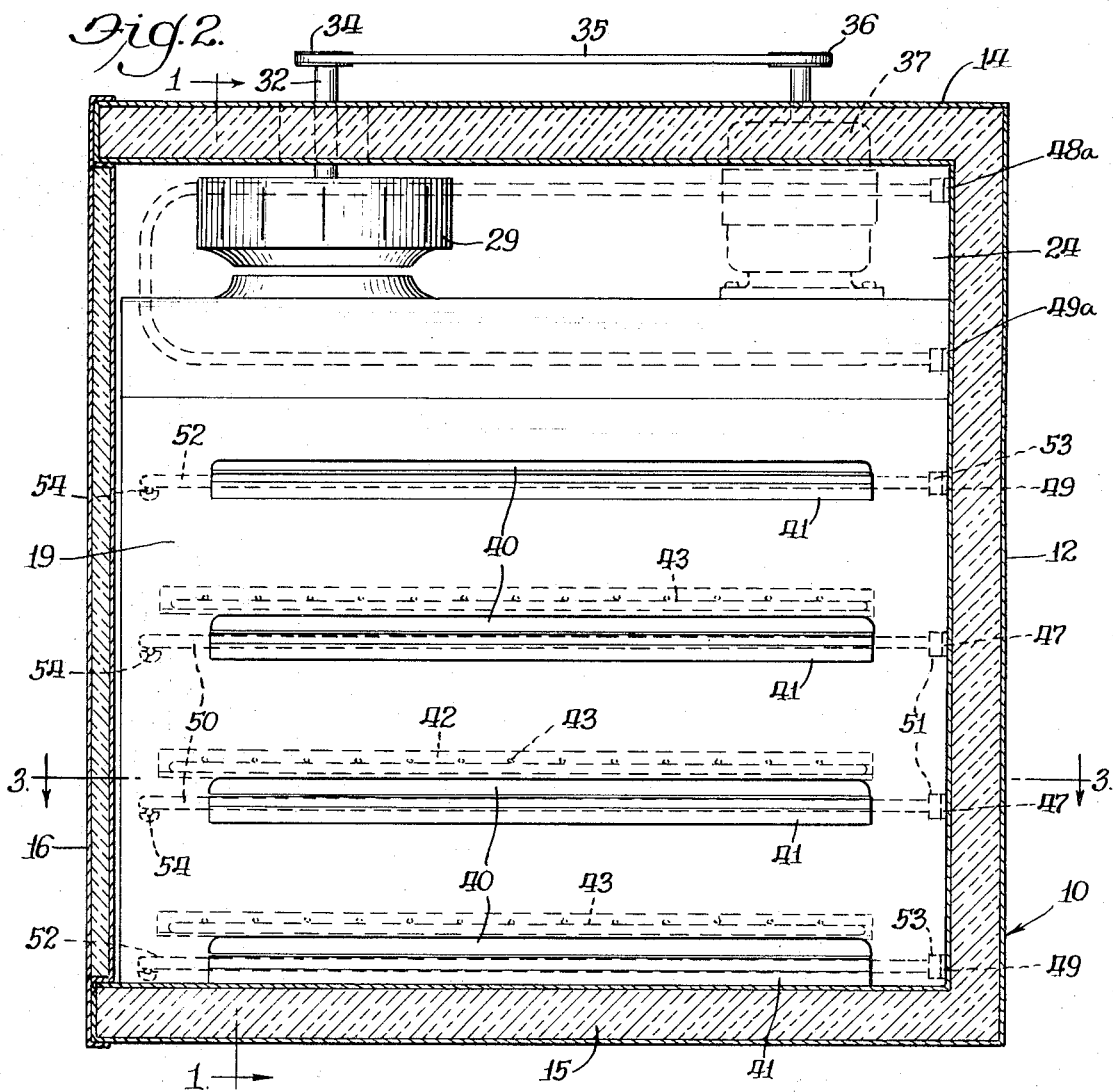
Figure 3:
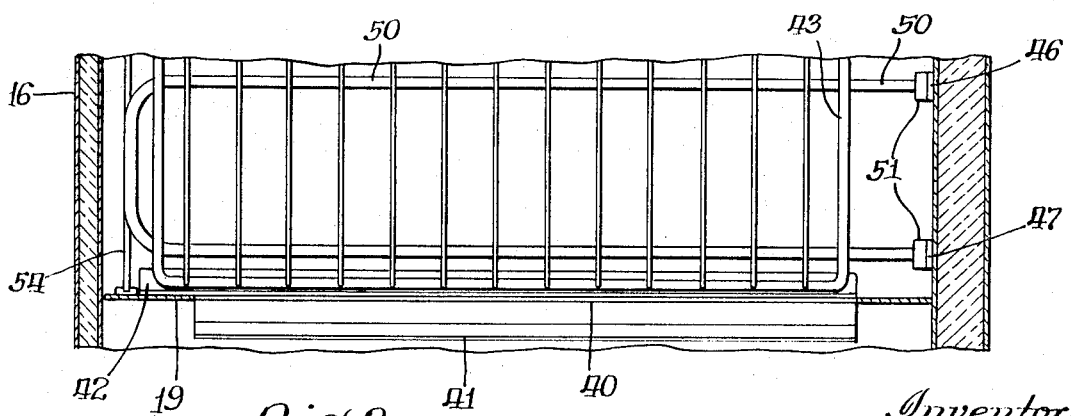
FIG. 3 is a partial horizontal section as seen at line 3–3 of FIG. 2.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The disclosed embodiment comprises an enclosure, generally 10. This enclosure has three insulated sidewalls 11, 12 and 13, an insulated top 14, an insulated base 15, and an insulated door 16. Within the enclosure 10 is a subenclosure, generally 17, comprising sidewalls 18 and 19 and an insulated top 20. The enclosures define a thawing and cooking chamber 23, a heater zone 24, and ducts 25 and 26 communicating therebetween. In a wall 27 between duct 25 and zone 24 is the intake opening 28 of a fan in the form of a centrifugal blower 29. Blower 29 includes a shaft 32 journaled in bearing 33 and having a pulley 34 secured thereto. A belt 35 connects pulley 34 and a pulley 36 on the output shaft of a fan motor 37. Wall 18 has a plurality of openings 39 to provide air communication between chamber 23 and duct 25. Similarly wall 19 has a plurality of openings 40. Below each of openings 39 and 40 is an air deflector 41. On the inside of walls 18 and 19 are affixed a plurality of angles 42 to support wire grid racks 43 which divide chamber 23 into a plurality of spaces for receiving containers of food.

Mounted on rear wall 12 are a plurality of intermediate pairs of sockets 46 and 47 respectively. Similarly, there are upper and lower pairs of sockets 48 and 49. In the heater zone 24 are similar pairs of sockets 46a, 47a and 48a, 49a. Heating units 50 have plugs 51 which are adapted to be received in sockets 46 and 47. There are top and bottom heating units 52 having plugs 53 adapted to mate with sockets 48 and 49. Heating units 50 and 52 differ in their heating capacities. To prevent them from being interchanged the plugs 50 and sockets 46 and 47 for the intermediate heating units have their inner engaging portions oriented differently (with respect to the heating unit) than is the case with respect to plugs 53 and the mating sockets 48 and 49. The heating units have a metallic sheath over the resistance wire and insulated therefrom by embedment in an electrical insulator, e.g., the type sold under the trademark Calrod. This adds mass and slows the reaction time. A plurality of removable rods 54 form supports for the distal ends of the heating units.

The control apparatus is illustrated in FIG. 4. The sockets 48 and 48a are connected by a wire 56 to one side of contactor switch 57. A wire 58 connects sockets 49 and 49a to one side of a contactor switch 59. Similarly, wires 60 and 61 respectively connect sockets 47, 47a and 46, 46a to one side of each of contactor switches 62 and 63. Wires 64 and 65 connect the respective contactor switches to connections 66 and 67 where electricity is supplied. This will usually be 220 or 440 volt (often three phase) depending upon the heating units employed.

Contactor switches 57 and 59 are closed by the energizing of solenoid 70. Similarly, a solenoid 71 is energized to close contactor switches 62 and 63. A signal light 72 is connected in parallel with solenoid 70 and a signal light 73 is connected in parallel with solenoid 71. The signal lights are suitably positioned so that the operator can tell at a glance which of the heating units are energized at any given time.

A wire 75 connects solenoids 70 and 71, signal lights 72 and 73, and fan motor 37 to one side of a suitable source of electric power. The other side of the power supply is connected by a wire 76 to a main switch 77. A wire 78 connects main switch 77 to switch 79 of a main timer 80. Timer 80 is controlled by a motor 81 which (as is the case with respect to the remaining timers described) may be a spring motor or an electric motor. The timer has a suitable manual adjustment by which the overall period may be set. During the period of time selected, switch 79 remains closed and opens at the end of the period. Preferably, the timer includes a bell (not shown) which rings at the time switch 79 opens.

A wire 83 connects switch 79 with the blades 84 and 85 of a pair of single-pole, double-throw switches interconnected to operate together and serving as a "function" switch. Associated with blade 84 are a pair of contacts 86 and 87, and a pair of contacts 88 and 89 are associated with blade 85. Contact 89 is connected by a wire 90 to speed control switch 91 of fan motor 37.

A "boost" timer 94 is driven by a motor 95 which controls a single-pole, double-pole switch comprising switch blade 96 and contacts 97 and 98. This timer is employed to determine for how long during (the initial part of) the thawing cycle additional heat is supplied in the thawing chamber. Switch blade 96 is connected by a wire 99 to contact 86.

Two "percent" timers 101 and 102 are employed. Timer 101 is effective during the initial part, or "boost" portion, of the thawing cycle, while timer 102 is employed during the remaining part of the timing cycle. Timer 101 has a switch 103 actuated by a motor 104 and timer 102 has a switch 105 actuated by a motor 106. Throughout a given interval, switches 103 and 105 are closed during a desired part of the interval and open during a desired part of the interval, under the control of the respective motors. The term "percent" relates to the ratio of the time that the switch is closed divided by the total interval. In an actual embodiment, an interval which totals 15 seconds has been found to be eminently satisfactory. No difficulty was encountered with a 30 second interval, and it is believed that even one minute intervals could be employed. If much greater intervals were used, the result would be too great a fluctuation in the radiator temperature during the thawing cycle.

If the interval is 15 seconds, and the switch 103 or 105 remains closed for 7½ seconds of the interval, then power is being supplied for 50 percent of the time. The timers are so constructed that the percentage of the interval, during which percentage the switch is closed, can be varied as desired. Thus, one can have a power-on condition (switch closed) for 80 percent of the interval or 20 percent of the interval, etc. Timers of this type are readily available commercially as stock items.

A wire 108 connects switch 103 to contact 97. A wire 109 connects switch 105 to contact 98. A wire 110 connects switches 103 and 105 to a pair of manually operable switches 111 and 112. Wires 113 and 114 respectively, connect switches 111 and 112 to solenoids 71 and 70 and signal lights 73 and 72.

A thermostat 116 has a sensor 117 which controls the opening and closing of switch 118. A wire 119 connects switch 118 to contact 87, while wire 109 connects switch 118 to switch 105. As seen in FIG. 1, sensor 117 is positioned to be washed by the air going to the intake 28 of fan 29.

THAWING AND HEATING OPERATION

The pans 123 holding the frozen food to be thawed are placed on racks 43, where they are positioned so that there are heating elements above them and below them. A standard size for these pans is 12 inches by 20 inches. At the present time the most common depth of pans is 2¼ inches. In the past it has been common to use pans 3 inches deep, but difficulties were encountered resulting from the wide variation of product temperature within the pan and the time required to bring the product to 160°—165° F. As a consequence, the depth of the pans in present use has been reduced. It appears likely that with the present invention the industry can return to the use of 3 inch pans.

The heating units 50, which will be sandwiched between pans, should have a heating capacity of no greater than about 93 B.t.u.'s per square inch of radiator surface. These heating units should be arranged so that in the space to be occupied by the pans the heating capacity of the element is no greater than about 33 B.t.u.'s per square inch of horizontal pan area. The top and bottom heating units 52 should have a substantially smaller heating capacity than that of the intermediate units 50. In an actual embodiment, constructed substantially as illustrated, the units 50 had a total heating capacity of 1,500 watts each and the heating units 52 were each one-half of that.

Before commencing the thawing operation, the "function" switch is moved to "thaw," i.e., the ganged switch blades 84 and 85 are moved to contacts 86 and 88 respectively. Switches 111 and 112 are closed, as illustrated. Timer 80 is set for the total thawing period to be employed. Timer 94 is set to control what portion of the total thawing period shall be at maximum heat, and percent timers 101 and 102 are set so as to give the desired heat on versus heat off times respectively. These various factors are initially determined empirically and then for any given product the setting of the timers is obtained from a chart. The chamber 23 is loaded with pans 123 of frozen food, preferably with no covers on the pans.

When main switch 77 is closed, with switch 79 previously being closed, electricity is supplied through wire 83 to wire 99, wire 108, percent timer 101, wire 110 to the two solenoids 70 and 71. The energizing of the solenoids closes the contactors 57, 59, 62 and 63 so that the heating units are energized. As previously described, the percent timer 101 supplies current for a predetermined percentage of the time. For the initial part of the thawing cycle, most frozen foods can withstand very substantial amounts of heat so percent timer 101 would be set to give continuous (or almost continuous) energizing of solenoids 70 and 71. As a matter of fact, in some embodiments the percent timer 101 can be eliminated and wires 108 and 110 merely connected together so that heat is supplied continuously during the initial part of the thawing cycle, which part is determined by the timer 94. The circuit from switch blade 96 through contact 97 and boot percent timer 101 constitutes and "override" circuit in parallel with the normal thawing circuit going from contact 98 through percent timer 102.

When the predetermined part of the thawing cycle comes to an end, timer 94 moves switch blade 96 to contact 98. This renders percent timer 102 effective for the remaining portion of the thawing cycle. During this remaining portion heat will be supplied at a substantially lower rate, i.e., percent timer 102 will be set so that switch 105 is closed for only (for example) 50 percent of the time. When the complete thawing cycle has been completed, timer 80 times out and opens switch 79 to terminate the heating. A bell will ring to indicate that the frozen food should be removed from the heating chamber. When getting ready to do this, the operator would also open main switch 77.

If only a few pans 123 of frozen food were to be thawed, the most efficient procedure would be to put the pans only on the rack in the middle space, i.e., between the two heaters 50. Switch 112 would be open so that solenoids 70 could not be energized. The cycle would proceed as previously described, but with this arrangement only the heaters 50 would be effective.

ORDINARY COOKING PROCEDURE

The unit illustrated and described can also be employed for normal cooking, e.g., baking of pies, cakes, etc., as well as for thawing frozen food. To employ it for cooking, it is often much more desirable to transfer the heat to the product by air conduction rather than by radiant heating, as is used in the food thawing. With all of the heating units in the chamber 23, as illustrated in the drawings, there might not be space available for the cooking of larger items, e.g., roasting a turkey.

While there are numerous arrangements that can be made in the heating units, the two most commonly used will be (1) all of the heating units 50 and 52 are removed from chamber 23 and inserted into the sockets in the heater zone 24, and (2) the heaters 52 will be allowed to remain in chamber 23, but all of the intermediate heaters 50 will be removed and inserted in the respective sockets in zone 24. For items such as pies, all of the heaters can be left in zone 23, since there will be a substantial reduction in heater temperature as a result of the air circulation as subsequently described. It is possible that heaters could be permanently inserted in sockets 46a, 47a, 48a and 49a and turned off or on as desired by suitable switches.

In any event, for normal cooking operation, the "function" switch is moved to "Bake," i.e., the combined switch blades 84 and 85 are moved to contacts 87 and 89 respectively. The main timer 80 is set for the desired cooking period. Switch 91 is set for the desired fan speed, one contact giving a substantially higher fan speed than the other. The thermostat 116 is adjusted to give the desired cooking temperature. The percent timer 102 can or cannot be employed. If it is not to be employed, it is set for 100 percent, i.e., the heaters are on all of the timer interval. With the product to be cooked in the chamber 23, the main switch 77 is closed. This energizes fan motor 37 to circulate air throughout the enclosure.

Any heaters that are in zone 24 will function for the purpose of heating that circulating air. Any heaters in chamber 23 will have a substantial lower surface temperature than will be the case were no air circulating. Thus, even if heaters are left in chamber 23, there will be little radiant heating effect therefrom. Most of the heat exchange will occur as a result of conduction from the heaters to the air and from the air to the product. Should the temperature rise above that desired, this will be detected by sensor 117 which will act to open switch 118, thus deenergizing solenoids 70 and 71 to shut off the supply of electricity to the heaters. After the temperature drops to the desired cooking temperature, sensor 117 will again close switch 118 to result in the energizing of the heaters.

I claim:

1. In a frozen food thawing and heating apparatus comprising an enclosure having walls defining a chamber having a plurality of racks defining a plurality of spaces, one above the other, for receiving containers of the frozen food to be thawed, and heating means above and below each of the spaces with the intermediate heating means being above one space and below another, the improvement comprising the topmost and the bottommost of the heating means having substantially less heating capacity than that of the intermediate heating means, said intermediate heating means having a heating capacity no greater than about 93 B.t.u.'s per square inch of heat radiating surface and no greater than about 33 B.t.u.'s per square inch of the horizontal part of said space to be occupied by said containers.

2. In an apparatus as set forth in claim 1, including control means connected to said heating means to control the operation thereof, said control means including a timed shutoff device for controlling the heating means by turning the heating means off and again on at regular intervals, said device being adjustable so that the ratio of the time on to the time off may be varied to thereby vary the amount of heat delivered.

3. In an apparatus as set forth in claim 2, wherein said control means includes an override for rendering said device ineffective to control the operation of the heating means.

4. In an apparatus as set forth in claim 3, wherein said heating means are individual, sheathed electric heating elements, and including mating plug and socket members, the plug members being attached to each heating element and the socket members being attached to a wall of the chamber, said members being separable whereby the elements may be removed from the chamber, said members being separable whereby the elements may be removed from the chamber, said enclosure walls defining an element receiving zone separate from said plurality of spaces, one of the walls of said zone having a plurality of said socket members so that said elements may be positioned in said zone and connected to said sockets therein, and including means comprising a fan and ducts communicating with said spaces and zone for circulating air through and between said spaces and said zone.

5. In an apparatus as set forth in claim 1, wherein said heating means are individual, sheathed electric heating elements, and including mating plug and socket members, the plug members being attached to each heating element and the socket members being attached to a wall of the chamber, said members being separable whereby the elements may be removed from the chamber, said enclosure walls defining an element receiving zone separate from said plurality of spaces, one of the walls of said zone having a plurality of said socket members so that said elements may be positioned in said zone and connected to said sockets therein, and including means comprising a fan and ducts communicating with said spaces and zone for circulating air through and between said spaces and said zone.

6. A combined frozen food thawing and food cooking apparatus for use with a source of electric power and comprising:
- an enclosure having walls defining a chamber for receiving pans and a heating zone spaced therefrom;
- racks in said chamber for holding said pans;
- heating units comprising a plurality of individual, sheathed electric heating elements;
- a plurality of mating plugs and sockets, said plugs being attached to said heating elements, one group of said sockets being secured to a wall of said chamber and positioned for holding heating elements above and below said pans, a second group of said sockets being secured to a wall of said zone for holding heating elements in said zone;
- circuit means connected to said sockets for connecting said sockets, and thereby the elements plugged into the sockets, to said source;
- air circulating means including ducts communicating with said chamber and zone and an electric fan for circulating air through and between said chamber and said zone;
- control means connected to said fan and adapted to be connected to said source for energizing said fan from said source, and including a switch for controlling the operation of the fan; and
- whereby with the heating elements in the chamber and with the fan turned off frozen food may be thawed, and with the fan turned on the chamber may be used for hot air cooking.

7. An apparatus as set forth in claim 6 wherein said circuit means includes a timed shutoff device for controlling the heating means by turning the heating means off and again on at regular intervals, said device being adjustable so that the ratio of the time on to the time off may be varied to thereby vary the amount of heat delivered.

8. In an apparatus as set forth in claim 7, wherein said circuit means includes an override for rendering said device ineffective to control the operation of the heating means.

9. In an apparatus as set forth in claim 6, wherein said heating units have a heating capacity no greater than about 93 B.t.u.'s per square inch of heat radiating surface.